United States Patent [19]

Kraus et al.

[11] Patent Number: 4,793,554
[45] Date of Patent: Dec. 27, 1988

[54] DEVICE FOR MAKING ARTIFICIAL SNOW

[76] Inventors: Edmund J. Kraus; Robert A. Kraus, both of 1636-T E. Edinger, Santa Ana, Calif. 92705

[21] Appl. No.: 190,684

[22] Filed: May 5, 1988

Related U.S. Application Data

[63] Continuation-in-part of Ser. No. 74,040, Jul. 16, 1987, Pat. No. 4,759,503.

[51] Int. Cl.⁴ ............................................. A01G 15/00
[52] U.S. Cl. ..................................... 239/2.2; 239/14.2
[58] Field of Search ...................... 239/2.2, 14.2, 432, 239/433, 430

[56] References Cited

U.S. PATENT DOCUMENTS

| | | | |
|---|---|---|---|
| 3,326,472 | 6/1967 | Gjerde | 239/430 |
| 3,494,559 | 2/1970 | Skinner | 239/2.2 |
| 3,524,590 | 8/1970 | Myskowski | 239/430 X |
| 3,567,116 | 3/1971 | Lindlof | 239/14.2 |
| 3,829,013 | 8/1974 | Ratnik | 239/14.2 |
| 4,759,503 | 7/1988 | Kraus et al. | 239/14.2 |

Primary Examiner—Andres Kashnikow
Assistant Examiner—Patrick N. Burkhart

[57] ABSTRACT

The disclosure relates to a method for making artificial snow involving the induction of compressed air into an annular disposed chamber and through a multitude of circumferentially and longitudinally spaced, radially inward directed orifices to be mixed with a steady stream of water. The mixture is then forced through a multitude of longitudinal directed orifices, where a substantial pressure drop subsequent to egress from the orifices causes a first stage atomization of the water into tiny, uniformly sized droplets and the concurrent pre-cooling of the droplets. The droplets are ten accelerated through an exit nozzle, where the final expansion of still partially compressed air to atmospheric pressure causes the final atomization, and the projecting of a thereby produced plume of water droplets through an trajectory within the cooler atmosphere along which the droplets are allowed to freeze into tiny, crystalline particles of ice before falling to the ground.

6 Claims, 2 Drawing Sheets

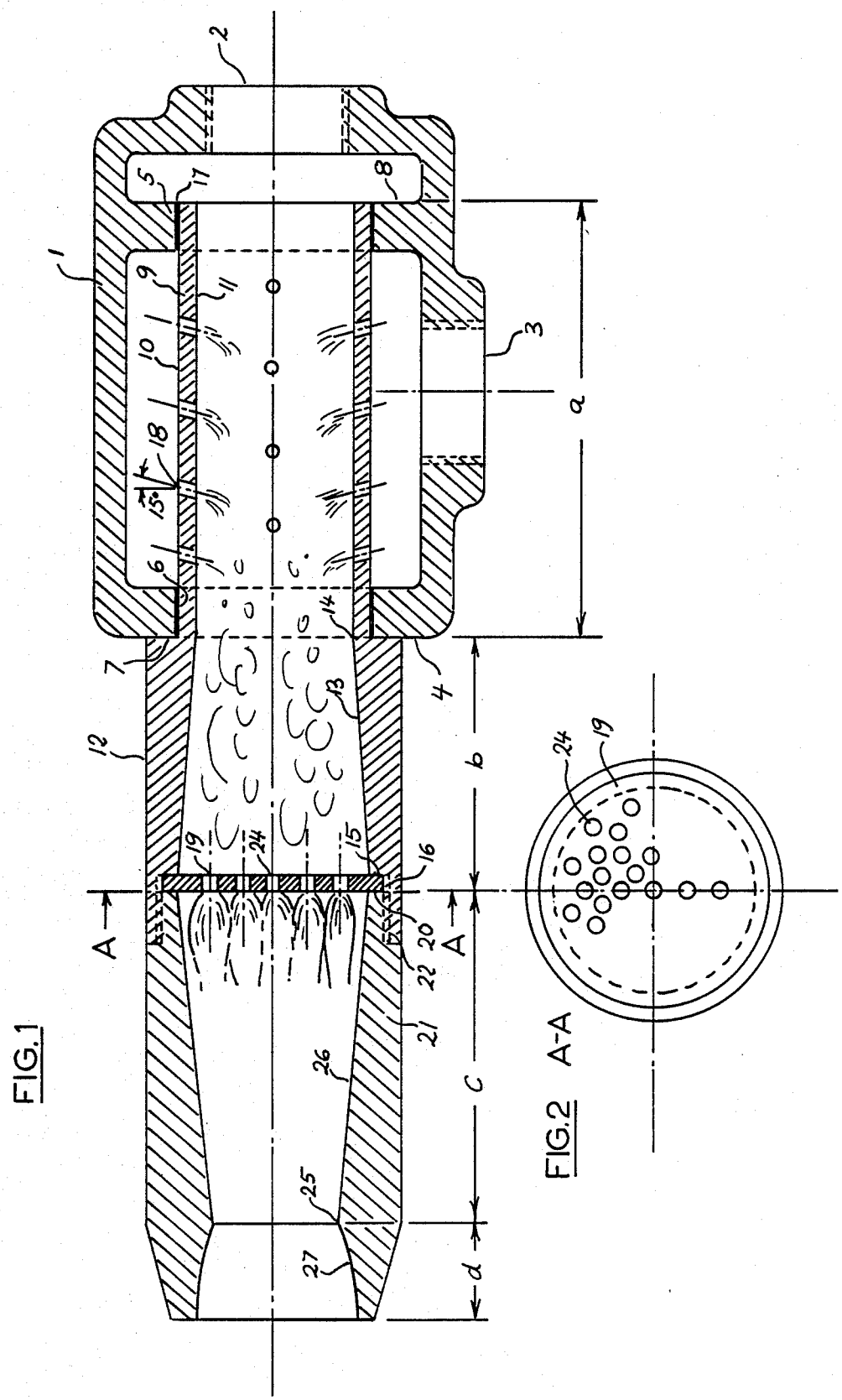

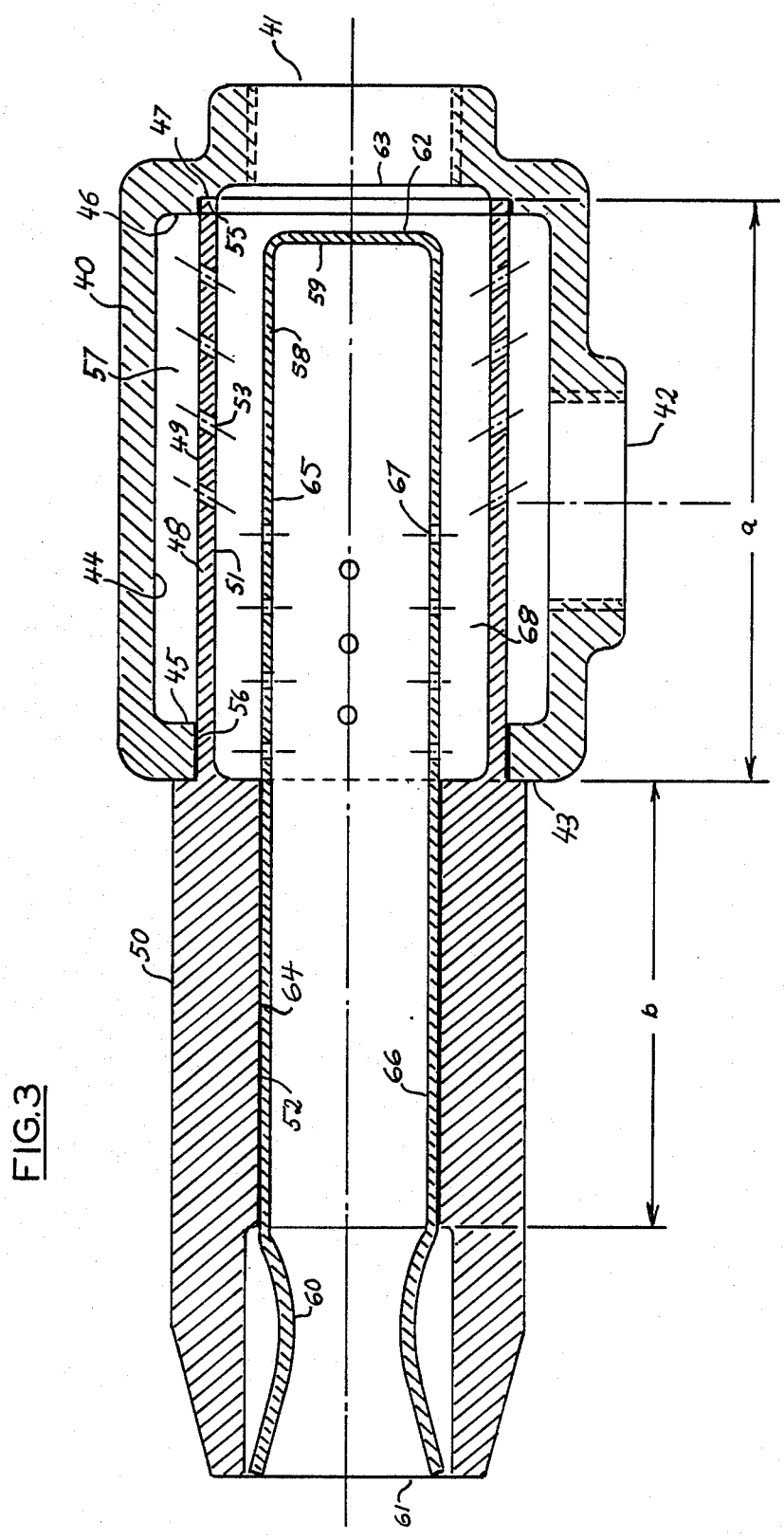

DEVICE FOR MAKING ARTIFICIAL SNOW

This application is a continuation in part of our co-pending application Ser. No. 07/074,040, filed on July 16, 1987 now U.S. Pat. No. 4,759,503, entitled "DEVICE FOR MAKING ARTIFICIAL SNOW".

FIELD OF THE INVENTION

The device of the present invention relates to an apparatus and method for making artificial snow, and more particular relates to snowmaking devices in which compressed air is used to finely atomize a steady stream of water into a jet of uniformly sized, tiny droplets, and in which the expansion of the compressed air causes an amount of pre-cooling of the atomized droplets, as well as causes the projecting of a plume of the atomized droplets through a trajectory within the colder atmosphere, along which the droplets freeze into crystalline particles of ice before falling to the ground.

BACKGROUND AND SUMMARY OF THE INVENTION

In the device of our co-pending application, compressed air of generally between 85 psig to 100 psig is used to finely atomize a steady stream of water into uniformly sized droplets, and to form a jet of atomized water which is projected through trajectory, along which the droplets cool to nucleating temperature in contact with the colder atmospheric air, and ultimately freeze into tiny, crystalline particles of ice before falling to the ground. Under extended use, the device of our co-pending application showed a fairly good efficiency; it is desirable, however, to further improve its ratio of air to water consumption, as well as it is desirable to improve the devices capability to atomize a steady stream of water into more uniformly sized droplets of a given size, and to improve the devices projecting range.

OBJECT OF THE PRESENT INVENTION

It is therefore an object of the present invention to substantially improve the devices allover efficiency by providing the means for a two stage atomizing of the device supplied water.

Another other object of the present invention is to provide the means for producing a multitude of progressive radial and axial expansions of the compressed air being mixed with the water; thereby achieving a substantial improvement in the atomization of the water into uniformly sized droplets.

A still other object of the present invention is to provide the means for achieving a substantial increase in the pre-cooling effect generated by the expansion of the compressed air being mixed with the water.

Yet another object of the present invention is to provide the means for achieving a substantial reduction in the noise level caused by the decompression of still partially compressed air to atmospheric pressure.

Yet a still further object of the present invention is to provide the means for achieving a substantial greater range of trajectory.

The features which are believed to be characteristic of the present invention, together with further objects and advantages will be better understood from the following description and accompanying drawing which we have chosen for purpose of explaining the basic concept of the invention, it is to be clearly understood, however, that the invention is capable of being implemented into other forms and embodiments within the scope and spirit of the defining claims by those skilled in the art, such as e.g., the method of using a structural adhesive in the assembly of the device, or the application of an aluminum oxide coding on the wear exposed parts which will be fully taken advantage of.

BRIEF DESCRIPTION OF THE DRAWINGS

FIG. 1 represents the sectional side view of the preferred embodiment of the present invention.

FIG. 2 represents the orifice plate, showing the relative spacing of apportion of the total number of the sharp edged atomizer orifices within the orifice plate as viewed from A—A in FIG. 1.

FIG. 3 represents the sectional side view of an alternate embodiment of the present invention.

DESCRIPTION OF THE PREFERRED EMBODIMENT

The basic concept of the preferred embodiment of the present invention is described in the following explanation supported by FIGS. 1 and 2 of the appended drawings. Accordingly, the device of the present invention comprises the main housing member 1 having the axial thereto disposed, internally threaded water inlet port 2; the laterally from the housing member extending, internally threaded air inlet port 3; the radial front end 4; and the radially disposed, internal partition 5. Both, the housing member front end 4 and the internal partition 5 are provided with an longitudinal bore 6 of given diameter extending from the housing member front end wall 7 through end wall 8 of partition 5. The device further comprises the tubular member 9 having the first portion provided with the cylindrical outer surface 10 and the cylindrical inner surface 11 at length (a), as well as having the second portion provided with the cylindrical outer surface 12 of a substantially larger diameter at length (b), and having the diverging inner surface 13 forming an extension from end 14 of the cylindrical inner surface 11 to the radial disposed end surface 15 at the end of the internally threaded portion 16. The portion (a) of tubular member 9 is inserted through bore 6 of the housing front end 7 and through partition 5, and is thereto securely fixed by means of a structural adhesive 17. Moreover, the cylindrical portion (a) of the tubular member 9 comprises a multitude of radially, and axially spaced apertures 18 extending at an angle of about 15 degree in direction toward the diverging portion (b) through the cylindrical outer surface 10 and the cylindrical inner surface 11 semi-radial inward. The device further comprises the radially disposed atomizer orifice plate 19 which is securely held between the radial disposed end surface 15 of tubular member 9 and the radial disposed end surface 20 of the projection nozzle 21 by screwing the externally threaded portion 22 of the projection nozzle 21 tightly into the internally threaded portion 16 of the tubular member 9. As may be seen in FIGS. 1 and 2 respectively, the orifice plate 19 comprises a multitude of specifically spaced, sharp edged orifices 24; whose aggregate of cross-sectional areas is substantially larger than the aggregate of cross-sectional areas of orifices 18, but is equal to the cross-sectional area of the narrow throat 25 located between the converging inner surface 26 at length (c), and the diverging exit portion 27 at length (d) whose inner surface conforms to the natural, progressive vector of expansion of the therefrom projecting plum of water droplets mixed with expanding air.

The method for making artificial snow in the preferred embodiment, involves the introduction of a steady stream of compressed air at approximately 95 psig into an annular disposed air distribution chamber surrounding a first tubular member; from where the compressed air then flows into/and through a multitude of circumferentially and longitudinally around the first tubular member spaced apertures, thereby forming within the tubular member a multitude of tiny, semi-radially inward directed jets of compressed air. The method further involves the introduction of a steady stream of water at a somewhat lower pressure into, and longitudinally through the first tubular member, wherein the multitude of radially inward directed jets of compressed air tent to penetrate the longitudinally directed stream of water, thereby causing a violent agitation and the mixing of the water with compressed air. The pressure difference existing up and downstream of an orifice plate being axially disposed between the first and an axial in series thereto disposed second tubular member forces the mixture of water and compressed air through a multitude of specifically within the orifice plate spaced, sharp edged orifices; whereby, the sharp edges, an the specific spacing between each pair of orifices causes the formation of a multitude of progressively in a longitudinal direction expanding jets of well atomized, uniformly sized water droplets to be generated. That is to say, as the mixture of water and compressed air egresses from the orifice plate, the rapid expansion of the compressed air being mixed with the water, tents to thoroughly atomize the jets of water into tiny, uniformly sized droplets; while the cooling effect generated by the expanding air tents to pre-cool the jets of droplets, which, subsequently merge into a single, fast accelerating stream within the converging section of the second tubular member. As the high velocity stream of water droplets egresses from the projecting nozzle, the still partially compressed air between the droplets, undergoes a second, rapid decompression to atmospheric pressure; thereby causing the final atomization of any water not jet being atomized, and the projecting a plume of water droplets through a trajectory within the colder atmosphere at relative low humidity, along which the droplets cool to nucleating temperature, partially be the process of conduction and convection, and partially by the process of evaporation, (i.e, by evaporating a minor portion of the outwardly projected water droplets), and along which, the droplets ultimately freeze by releasing their latent heat of solidification into tiny, crystalline particle of ice before falling to the ground.

As may be seen in FIG. 3, the alternate embodiment of the present invention comprises the main housing member 40, having the longitudinally thereto disposed, internally threaded water inlet port 41, the laterally therefrom extending internally threaded air inlet port 42, the front end 43, the cylindrical inner wall 44, and the radial inner end walls 45 and 46, as well as having the annular, retaining recess 47 being disposed at inner end wall 46. The device further comprises the first tubular member 48 having the cylindrical outer surface 49 extending at length (a), and the cylindrical outer surface 50 of substantially larger diameter; as well as having the cylindrical inner surface 51 of a given diameter extending at length (a), and having the cylindrical inner surface 52 of substantially smaller diameter extending at length (b). The tubular member 48 further comprises a series of circumferentially and longitudinally spaced apertures 53 being disposed so as to extent at an angle of approximately 45 degree from the outer surface 49 through the inner surface 51 semi-radial inward. The housing portion front end 43 and inner end wall 46 is provided with a longitudinal bore being slightly larger than the smaller diameter of the tubular member 48. The small diameter end of tubular member 48 is inserted into the bore of housing portion 40 so as to extend with end 55 into the annular retaining recess 47, and is there within securely fastened by means of an structural adhesive 56. Thereby forming the annular air distribution chamber 57 surrounding the smaller diameter portion of the first tubular member. Moreover, the device further comprises the second tubular member 58 having a first portion 65 being closed at end 59, and having a second portion 66 provided with the constricting throat 60 at the exit orifice 61, as well as having a multitude of circumferentially and longitudinally spaced atomizer orifices 67 disposed around the first portion. The second tubular member is inserted into the smaller diameter bore 52 of the first tubular member 48 so as to space its outer end wall 62 at a substantial distance from the inner end wall 63 of the housing member 40, and is securely fastened by means of an structural adhesive 64 to the smaller diameter inner wall 52 of the first tubular member 48 so as to form the annular air-water mixing chamber 68 between the first portion of the first tubular member and the first portion of the second tubular member.

The method of making artificial snow in the alternate embodiment, involves the induction of a steady stream of compressed air at a substantially elevated pressure via an annular disposed air distribution chamber into-/and through a multitude of circumferentially and longitudinally spaced, radially inward directed apertures into a annular disposed mixing chamber, wherein the compressed air forms a multitude of radially inward directed jets. Concurrently therewith, the method further involves the induction of a steady stream of water at a substantially lower pressure into the mixing chamber, wherein the jets of compressed air cause a violent agitation, and the mixing of the water with compressed air. The mixture of water and compressed air then flows into/and through a multitude of circumferentially and longitudinally around accelerator tube radially inward disposed, sharp edged orifices. Whereby, substantial drop in pressure, and the relative distance between each pair of orifices causes the atomization of the water into jets of tiny, uniformly sized droplet mixed with compressed air, which undergo a change from their radially inward, to a longitudinal direction so as to merge within the accelerator tube into a single, longitudinally accelerating mass of water droplets and compressed air; and whereby the concurrent, cooling effect generated by the expansion of the compressed air causes the nucleation of a substantial amount of water droplets within the accelerator tube. Subsequent to egress from the accelerator tube, the still partially compressed air between the longitudinally accelerated water droplets, is subject to final expansion to atmospheric pressure, thereby causing the final atomization of any water not jet being atomized, and a further cooling of the droplets. The highly accelerated water droplets then assure a trajectory through the still colder atmospheric air at low humidity, along which the droplets super-cool to nucleating temperature partially by the processes of conduction and confection, and partially by the process of evaporating a minor portion of the outward projected water droplets; and along which the supercooled droplets freeze by dissipating their latent heat of solidification, into tiny crystalline particle of ice, before falling to the ground.

What is claimed is:

1. An apparatus and method for making artificial snow, comprising:
   (a) a housing means having a laterally thereto disposed, first inlet port connectable to a source of compressed air, and having an axially disposed second inlet port connectable to a source of pressurized water;
   (b) a first tubular member having a first portion being provided with a cylindrical inner wall, a multitude of circumferential and longitudinally spaced holes, and an axial to said second inlet port connected entrance aperture; as well as being provided with second portion having a diverging inner wall, and an internally threaded exit aperture;
   (c) a second tubular member having a converging inner wall, an externally threaded axial disposed entrance aperture, and an axial disposed exit nozzle to atmosphere;
   (d) a flat disk having a multitude of longitudinally aligned atomizer orifices, being flow restrictive disposed between said exit aperture of said first tubular member, and said entrance aperture of said second tubular member;

said first tubular member being fixed within said housing means so as to form within an annular chamber surrounding said first portion of said first tubular member; and so as to form a fluid communicative passage from said first inlet port through said annular chamber, and via said multitude of holes into said first tubular member; as well as to form a second fluid communicative passage from said second inlet port through said first tubular member, and via said atomizer orifices and said second tubular member and exit nozzle into atmosphere;

said method involves:
   (1) the induction of a steady stream of compressed air through said first inlet port, and the conduction of said compressed air via said annular chamber and said multitude of holes so as to form within said first tubular member a multitude of radially inward directed jets of compressed air;
   (2) the concurrent induction of a steady stream of water at a substantially lower pressure through said second inlet port so as to follow a path, longitudinal through said first tubular member, and via said atomizer orifices and through said second tubular member and exit nozzle into atmosphere;
   (3) the mixing of said compressed air with said stream of water, within said first tubular member;
   (4) the forcing of said mixture of water and compressed air through said atomizer orifices, thereby causing the partial expansion of said compressed air, and the consequential first atomization, i.e., the formation of a multitude of progressive in longitudinal direction expanding jets of tiny, uniformly sized water droplets being mixed with partially decompressed air;
   (5) the merging of said multitude of jets into a single stream of atomized water droplets mixed with still partially compressed air and the accelerating of said mixture to maximum velocity toward said exit nozzle within said second tubular member;
   (6) the concurrent utilization of the cooling effect generated by the partial expansion of said compressed air for pre-cooling, and thereby partially nucleating said water droplets before egress through said nozzle into atmosphere;
   (7) the final expansion of said still partially compressed air to atmospheric pressure, thereby causing the final atomization of any water not jet being atomized, and the projecting of a plume of finely atomized water droplet from said nozzle, through an trajectory within the colder atmospheric air, along which said droplets freeze into tiny crystalline particle of ice before falling to the ground.

2. A device as resided in claim 1, wherein said first tubular member is firmly retained within said housing means by means of an structural adhesive.

3. Device as resided in claim 1, in which said first tubular member and said second tubular member are longitudinally combined by means of internally and externally threaded portions, which are arranged so as to firmly hold said atomizer disk axially between said second aperture of said first tubular member and said third aperture of said second tubular member.

4. A device as resided in claim 1, wherein said first tubular member comprises a first section of cylindrical inner wall extending longitudinally from said second inlet port substantially to its midpoint, and having a second section whose inside diameter progressively decrease from said midpoint toward said second aperture; and wherein said second tubular member having a first section, whose inside diameter progressively decreases from said third aperture substantially to a narrow construction, and having a second section whose inside diameter progressively increased from said narrow constriction toward said exit aperture to atmosphere; and in which the inner wall of said second section conforms to the natural shape of the progressively from said narrow constriction longitudinally outward expanding plume of compressed air and water droplets.

5. A device as resided in claim 4 wherein said first multitude of holes extent through said first section of said first tubular member at an angle of approximately 15 degree semi-radial indirection toward said second aperture inward.

6. An apparatus and method for making artificial snow, comprising:
   (a) a housing means having laterally thereto disposed, first inlet port connectable to a source of compressed air, and having an axial disposed second inlet port connectable to a source of pressurized water;
   (b) a first tubular member having a first portion of a given internal diameter provided with an inlet aperture and a multitude of circumferentially and longitudinally spaced holes, as well as having a second portion of substantially smaller internal diameter having a first and second axial disposed aperture;
   (c) a second tubular member having a first portion being closed at one end and being provided at said portion with a multitude of circumferentially and longitudinally disposed atomizer orifices; and having a second portion being provided with an narrow throated axial disposed exit nozzle;

said first tubular member being fixed within said housing means so as to form within, a first annular chamber surrounding said first portion of said first tubular member;

said second tubular member being coaxially fixed within said first tubular member so as to form a second annular chamber between said first portion of said first tubular member and said first portion of said second tubular member; and, so as to form a first fluid communicative passage from said first inlet port via said first annular chamber, said multitude of holes, said second annular chamber and said multitude of atomizer orifices radially into/and longitudinally through said second tubular member into atmosphere;

as well as to form a second fluid communicative passage from said second inlet port via said second annular chamber and said multitude of atomizer orifices radially into/and longitudinally through said second tubular member into atmosphere;

said method involves:

(a) the induction of a steady stream of compressed air through said first inlet port, and the conduction of said compressed air via said first annular chamber and said multitude of holes, so as to form within said second chamber a multitude of inward directed jets of compressed air;

(b) the concurrent induction of a steady stream of water at substantially lower pressure through said second inlet port, and the conduction of said water into said second annular chamber;

(c) the mixing of said compressed air and water within said second chamber;

(d) the forcing of said mixture of compressed air and water through said multitude of atomizer orifices to generate a multitude of inward directed jets of atomized, uniformly sized water droplets mixed with partially decompressed air;

(e) causing a change in direction of the multitude of jets of atomized water droplets from the radial inward to a longitudinal direction, and causing the merger of said multitude of jets into a single fast accelerating mass within said second portion of said second tubular member, and through said exit nozzle into atmosphere;

(f) the concurrent utilization of the cooling effect generated by said expanding air in the pre-cooling and pre-nucleating of said water droplets subsequent to egress from said multitude of atomizer orifices; and, (g) the full expansion of the still partially compressed air to atmospheric pressure; thereby causing the final atomization of water not jet being atomized, and the projecting of an plume of water droplets through the colder atmosphere, along which the droplets freeze into tiny crystalline particle of ice.

* * * * *